US008872904B1

(12) United States Patent
Hwang et al.

(10) Patent No.: US 8,872,904 B1
(45) Date of Patent: Oct. 28, 2014

(54) DISPLAY APPARATUS AND METHOD OF DISPLAYING MULTI-VIEW IMAGES

(71) Applicant: Samsung Electronics Co., Ltd., Suwon-si (KR)

(72) Inventors: Dong-choon Hwang, Suwon-si (KR); Farid Mukhtarov, Suwon-si (KR); Seon-deok Hwang, Yeongi-gun (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 14/184,059

(22) Filed: Feb. 19, 2014

(30) Foreign Application Priority Data

May 24, 2013 (KR) ........................ 10-2013-0059321

(51) Int. Cl.
*H04N 13/04* (2006.01)
*G02B 27/22* (2006.01)

(52) U.S. Cl.
CPC ....... *H04N 13/0429* (2013.01); *H04N 13/0418* (2013.01); *G02B 27/2214* (2013.01); *H04N 13/0422* (2013.01); *H04N 13/0409* (2013.01); *H04N 13/0406* (2013.01)

USPC ............................... 348/54; 345/209; 359/464

(58) Field of Classification Search
None
See application file for complete search history.

(56) References Cited

U.S. PATENT DOCUMENTS

2008/0192067 A1* 8/2008 Barenbrug et al. ........... 345/607
2011/0304601 A1* 12/2011 Niioka et al. ................. 345/209

* cited by examiner

*Primary Examiner* — Sath V Perungavoor
*Assistant Examiner* — Dakshesh Parikh
(74) *Attorney, Agent, or Firm* — Sughrue Mion, PLLC

(57) ABSTRACT

A display apparatus is provided. The display apparatus includes: a display panel configured to include a plurality of pixels including a plurality of sub pixels and display an image frame; a visual field divider configured to be disposed on a front surface of the display panel; and a controller configured to render and display a first image frame to display a first view image in at least some of the plurality of sub pixels and a second image frame so that a second view image is shifted and displayed based on a position in which the first view image is displayed in the at least some of the sub pixels based on a distance between the display panel and the visual field divider.

20 Claims, 10 Drawing Sheets

US 8,872,904 B1

DISPLAY APPARATUS AND METHOD OF DISPLAYING MULTI-VIEW IMAGES

CROSS-REFERENCE TO RELATED APPLICATION(S)

This application claims priority under 35 U.S.C. §119 from Korean Patent Application No. 10-2013-0059321, filed on May 24, 2013, in the Korean Intellectual Property Office, the disclosure of which is incorporated herein by reference, in its entirety.

BACKGROUND

1. Field

The exemplary embodiments generally relate to providing a display apparatus and a method of displaying a multi-view image. More particularly, the exemplary embodiments relate to a display apparatus that provides a stereoscopic image by using a glassless method, and a method of displaying a multi-view image using the same.

2. Description of the Related Art

The development of display apparatuses providing stereoscopic images has accelerated to provide users with a more realistic viewing experience. Such a display apparatus may be classified into a glass type and a glassless type, according to whether eyeglasses for viewing a stereoscopic image are used.

The glassless type display apparatus displays a multi-view image and allows images captured at different viewpoints to be incident into left and right eyes of a user through a lenticular lens or a parallax barrier, so that the user experiences a 3-dimensional (3D) effect.

Manufacturers of glassless type display apparatuses have designed the glassless type display apparatuses so that a viewing distance (i.e., a distance between a display apparatus and a user) is about 3 m in consideration of fatigues, etc. of users. Hereinafter, the viewing distance will be referred to as a reference viewing distance.

For example, as shown in FIG. 1, a distance L2 between a display panel 10 having a pixel size of 0.21 mm and a lenticular lens 20 (or a parallax barrier) is set to 10 mm. Therefore, a first view image and a second view image keeps a distance of 63 mm at a point at which a viewing distance L1 is 3 m. A position in which an image is formed at a reference viewing distance may be referred to as a viewing area. Here, 63 mm refers to a distance that is determined in consideration of a distance between two eyes of a user, and thus users may be provided with stereoscopic images at a distance of 3 m from a display apparatus.

In general, a material, such as glass, is formed between the display panel 10 and the lenticular lens 20. Therefore, a reduction in a size of the glass operates as an important factor in reducing the price and weight of display apparatuses. However, if only a distance between the display panel 10 and the lenticular lens 20 is reduced, the first and second view images do not maintain the distance of 63 mm from each other at the reference viewing distance, and thus a stereoscopic image may not be provided to the user.

Therefore, there is a need for a method of keeping an optimal viewing distance and reducing a distance between a display panel and a lenticular lens.

SUMMARY

Exemplary embodiments address at least the above problems and/or disadvantages and other disadvantages not described above. Also, the exemplary embodiments are not required to overcome the disadvantages described above, and an exemplary embodiment may not overcome any of the problems described above.

The exemplary embodiments provide a display apparatus that reduces a distance between a display panel and a lenticular lens, keeps an optimal viewing distance from a user, and provides a stereoscopic image by using a glassless method, and a method of displaying a multi-view image using the same.

According to an aspect of the exemplary embodiments, a display apparatus is provided including: a display panel configured to include a plurality of pixels which include a plurality of sub pixels and display an image frame; a visual field divider configured to be disposed on a front surface of the display panel; and a controller configured to render and display a first image frame in order to display a first view image in at least some of the plurality of sub pixels and a second image frame so that a second view image is shifted and displayed based on a position in which the first view image is displayed in at least some of the sub pixels based on a distance between the display panel and the visual field divider.

The controller may be configured to determine a degree of shift of the second view image so that the second view image is inversely proportional to the distance between the display panel and the visual field divider, in at least some of the sub pixels.

The controller may be configured to render the second image frame in which different view images and the shifted second view image are sequentially arranged in at least some of the sub pixels, according to the degree of shift of the second view image.

The controller may be configured to mix a pixel value of the shifted second view image and pixel values of the different view images based on ratios of the shifted second view image and the different view images occupied in at least some of the sub pixels, in order to display the second image frame.

The first and second image frames may be displayed at 120 Hz on the display panel.

According to another aspect of the exemplary embodiments, there is provided a method of displaying a multi-view image in a display apparatus including a display panel having a plurality of pixels which comprise a plurality of sub pixels and a visual field divider disposed on a front surface of the display panel. The method may include: rendering and displaying a first image frame in order to display a first view image in at least some of the plurality of sub pixels; rendering a second image frame so that a second view image is shifted and displayed based on a position in which the first view image is displayed in at least some of the sub pixels based on a distance between the display panel and the visual field divider; and displaying the second image frame.

The rendering of the second image frame may include: determining a degree of shift of the second view image so that the second view image is inversely proportional to the distance between the display panel and the visual field divider in at least some of the sub pixels.

The rendering of the second image frame may include: rendering the second image in which different view images and the shifted second view image are sequentially arranged in at least some of the sub pixels according to the degree of shift of the second view image.

A pixel value of the shifted second view image and pixel values of different view images may be mixed based on ratios of the shifted second view image and the different view images occupied in at least some of the sub pixels, in order to display the second image frame.

The first and second image frames may be displayed on the display panel at 120 Hz.

An aspect of an exemplary embodiment may provide a display apparatus including: a controller configured to render and display a first image frame in order to display a first view image in at least some of a plurality of sub pixels and to display a second image frame so that a second view image is shifted and displayed based on a position in which the first view image is displayed in at least some of the sub pixels.

The display apparatus may further include a display panel configured to include a plurality of pixels comprising the plurality of sub pixels. The display apparatus may further include a visual field divider configured to be disposed on a front surface of the display panel.

The first view image may be displayed in at least some of the sub pixels, based on a distance between the display panel and the visual field divider.

The controller is configured to determines degree of shift of the second view image so that the second view image is inversely proportional to the distance between the display panel and the visual field divider in at least some of the sub pixels.

The controller may be configured to render the second image frame in which different view images and the shifted second view image are sequentially arranged in at least some of the sub pixels, according to the degree of shift of the second view image.

The controller may be configured to mix a pixel value of the shifted second view image and pixel values of the different view images based on ratios of the shifted second view image and the different view images occupied in at least some of the sub pixels, in order to display the second image frame.

In addition, the first and second image frames are displayed at 120 Hz on the display panel.

An aspect of an exemplary embodiment may further provide a method of displaying a multi-view image in a display apparatus including a display panel having a plurality of pixels including a plurality of sub pixels and a visual field divider disposed on a front surface of the display panel, the method including: rendering and displaying a first image frame in order to display a first view image in at least some of the plurality of sub pixels rendering a second image frame so that a second view image is shifted and displayed based on a position in which the first view image is displayed in at least some of the sub pixels based on a distance between the display panel and the visual field divider.

The method may further include the step of displaying the second image frame.

BRIEF DESCRIPTION OF THE DRAWINGS

The above and/or other aspects will be more apparent by describing certain exemplary embodiments with reference to the accompanying drawings, in which.

DETAILED DESCRIPTION OF THE EXEMPLARY EMBODIMENTS

Figure 1:
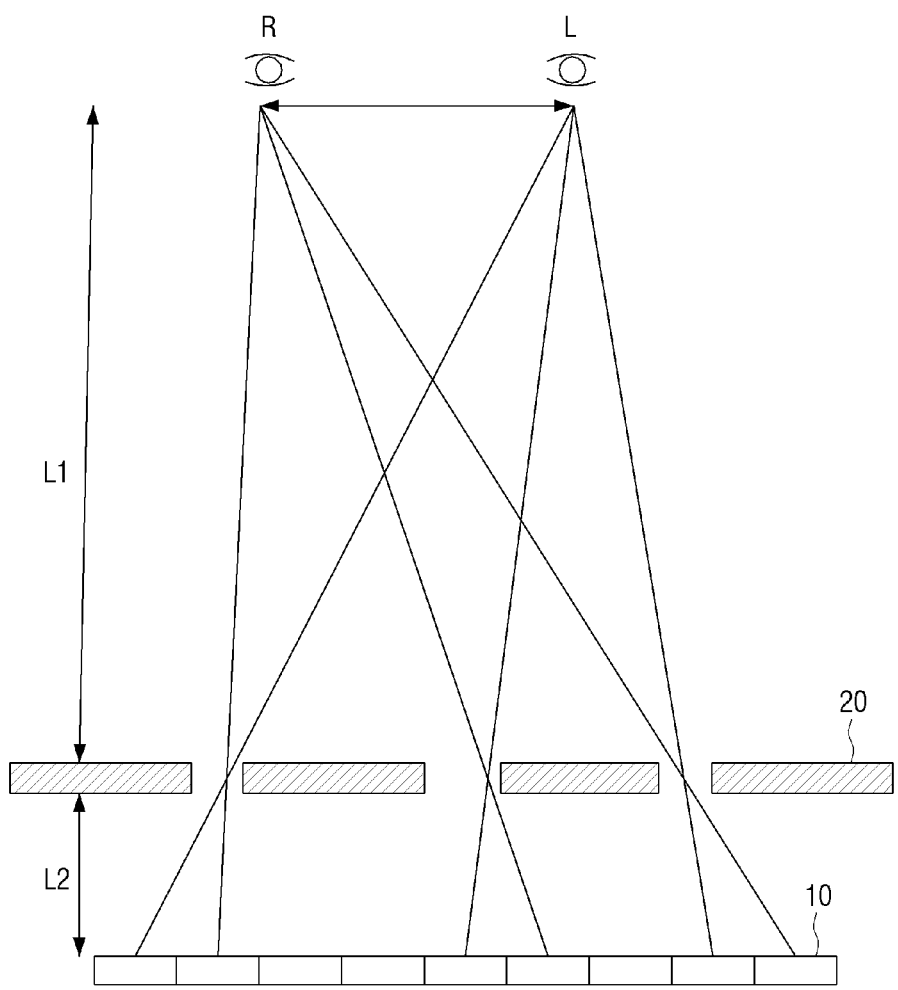
FIG. 1 is a view which illustrates an operation of a display apparatus that provides a stereoscopic image by using a glassless method of the related art.

Exemplary embodiments are described in greater detail with reference to the accompanying drawings.

In the following description, the same drawing reference numerals are used for the same elements even in different drawings. The matters defined in the description, such as detailed construction and elements, are provided to assist in a comprehensive understanding of the exemplary embodiments. Thus, it is apparent that the exemplary embodiments can be carried out without those specifically defined matters. Also, well-known functions or constructions are not described in detail since they would obscure the exemplary embodiments with unnecessary detail.

Figure 2:
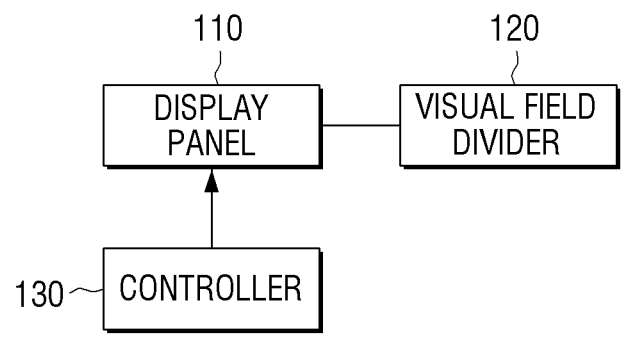
FIG. 2 is a block diagram which illustrates a structure of a display apparatus according to an exemplary embodiment.

FIG. 2 is a block diagram which illustrates a structure of a display apparatus 100 according to an exemplary embodiment.

The display apparatus 100 of FIG. 2 is an apparatus that displays a multi-view image to provide a stereoscopic image by using a glassless method. The multi-view image includes a plurality of images of an object that are captured at different angles. In other words, the display apparatus 100 refracts the plurality of images, which are captured at the different views, at different angles and provides an image that is focused in a position (for example, about 3 m) while maintaining a predetermined distance that is referred to as a viewing distance. The position in which the image is formed is referred to as a viewing area. Therefore, if one of the eyes of a user is positioned in a first viewing area, and the other one of the eyes of the user is positioned in a second viewing area, the user may experience a 3-dimensional (3D) effect.

The display apparatus 100 of FIG. 2 may be implemented through various types of display apparatuses such as a TV, a monitor, a portable phone, a personal digital assistant (PDA), a personal computer (PC), a set-top PC, a tablet PC, an electronic frame, a kiosk PC, etc.

Referring to FIG. 2, the display apparatus 100 includes a display panel 110, a visual field divider 120, and a controller 130.

The display panel 110 includes a plurality of pixels, each of which includes a plurality of sub pixels. Here, the sub pixels may be red (R), green (G), and blue (B) sub pixels. In other words, pixels including R, G, and B sub pixels may be arrayed in a plurality of columns and a plurality of rows to form the display panel 110.

The display panel 110 displays an image frame. The image frame is an image frame that may provide a stereoscopic image to the user by using a glassless method, and its detailed contents will be described later.

Although not shown in FIG. 2, in response to the display panel 110 being implemented as a liquid crystal display (LCD) panel, the display apparatus 100 may further include a backlight (not shown) that supplies backlight to the display panel 110 and a panel driver (not shown) that drives the pixels of the display panel 110 according to pixel values of the pixels which constitute the image frame.

Therefore, in response to light generated by the backlight being incident onto the pixels of the display panel 110, the display panel 110 adjusts transmissivity of the light incident onto the pixels according to an image signal in order to display the image frame. In particular, the display panel 110 includes a liquid crystal layer and two electrodes that are formed on both surfaces of the liquid crystal layer. In response to a voltage being applied to the two electrodes, an electric field is generated, and thus molecules of the liquid crystal layer between the two electrodes move. Therefore, the transmissivity of the light is adjusted.

The visual field divider 120 is disposed on a front surface of the display panel 110. In this case, the visual divider 120 may be implemented as a lenticular lens or as a parallax barrier.

For example, the visual field divider 120 may be implemented as a lenticular lens that includes a plurality of lens areas. Therefore, the lenticular lens may refract an image displayed on the display panel 110 through the plurality of lens areas. Each of the lens areas is formed in a size which corresponds to at least one pixel, and thus the lens areas may disperse light differently while respectively penetrating the pixels according to the viewing areas.

As another example, the visual field divider 120 may be implemented as a parallax barrier. The parallax barrier may be implemented as a transparent slit array that includes a plurality of barrier areas. Therefore, the parallax barrier blocks light through slits between the barrier areas to emit images at different views according to the viewing areas.

The visual field divider 120 may be inclined at a predetermined angle in order to operate to improve image quality. The controller 130 may divide image frames of images that are respectively captured at a plurality of views, based on an angle of inclination of the visual field divider 120 and may combine the image frames to generate an image frame. Therefore, the user does not view an image vertically or horizontally displayed in the sub pixels of the display panel 110, but rather views an image that is displayed in the sub pixels to have a predetermined slope.

The controller 130 controls an overall operation of the display apparatus 100. In particular, the controller 130 may control to render and display an image frame, so that images having different views are positioned at predetermined distances from one another in a reference viewing area, based on the distance between the display panel 110 and the visual field divider 120. The images having the different views may be formed at distances of 63 mm from one another in the reference viewing area.

A method of displaying a multi-view image according to an exemplary embodiment will now be described in detail with reference to FIGS. 3 through 5.

Figure 3:
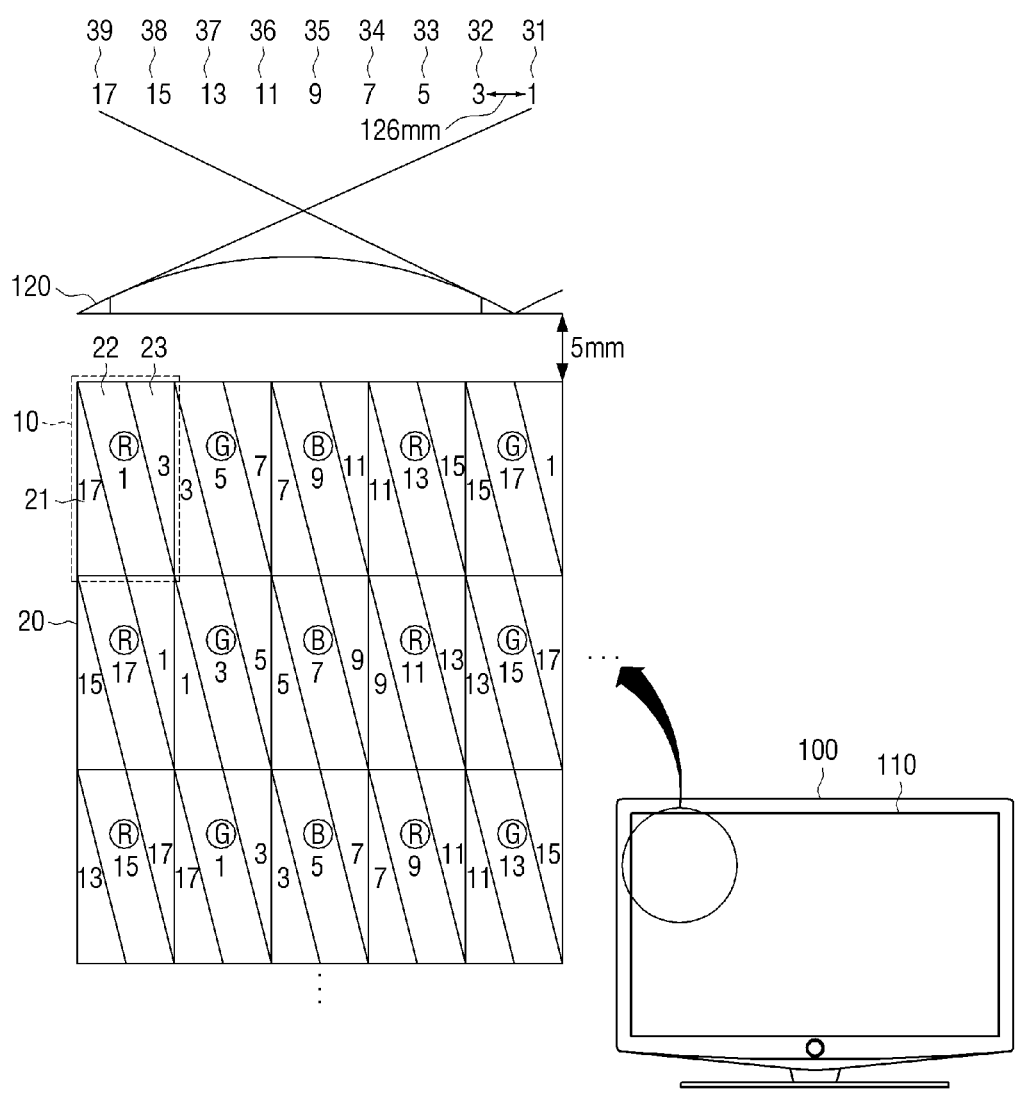
FIGS. 3 through 8 are views which illustrates a method of displaying a multi-view image according to an exemplary embodiment.
Figure 4:
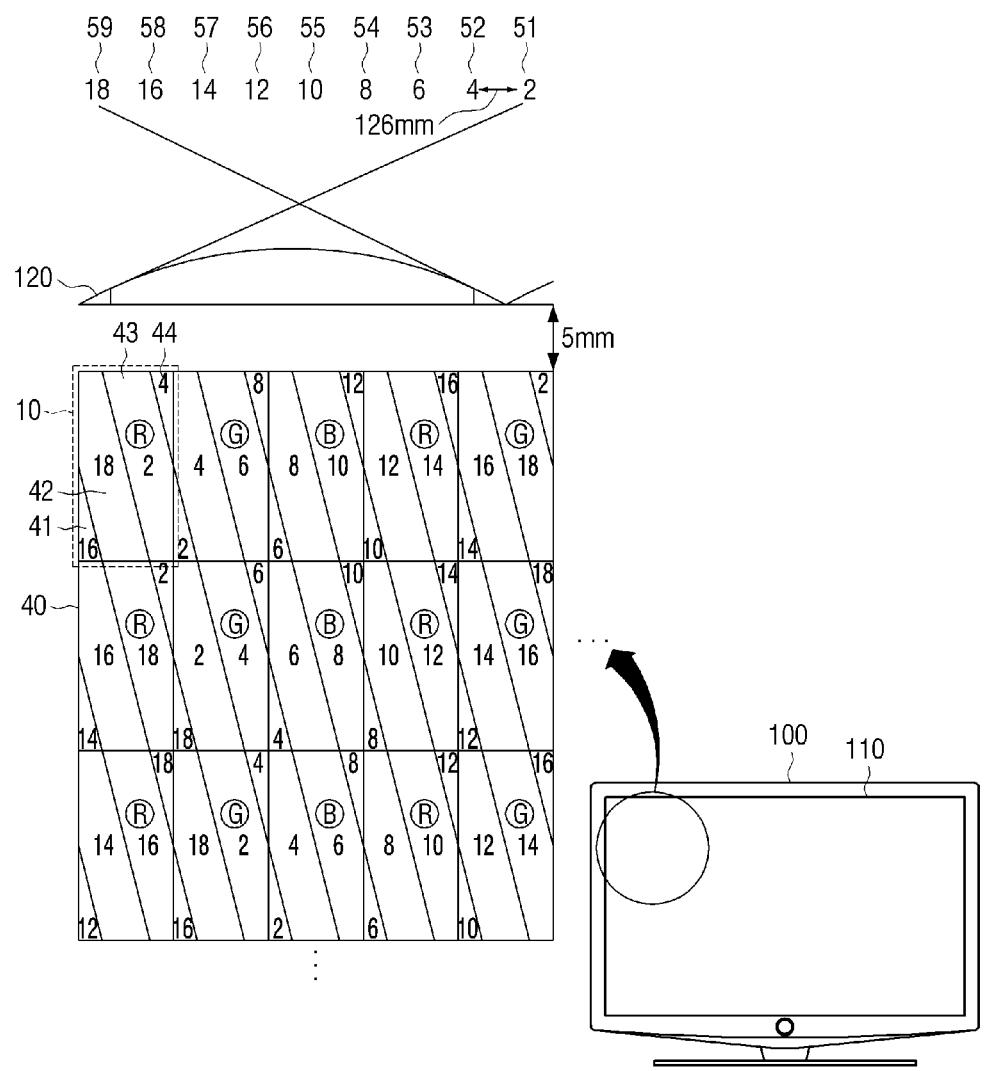
Figure 5:
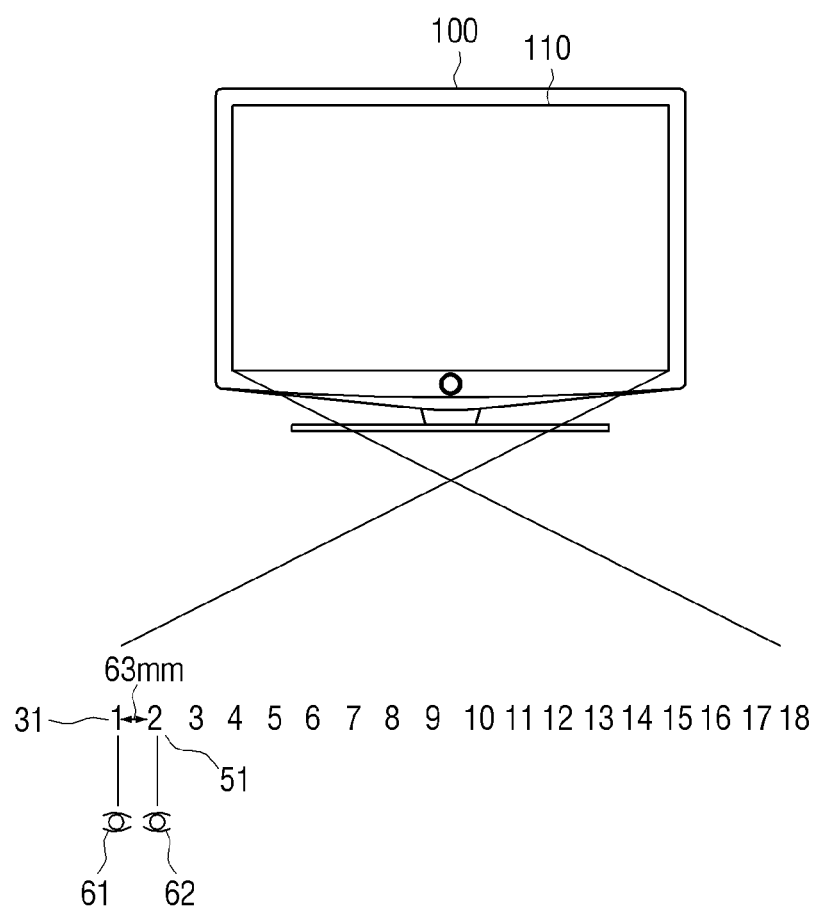

In FIGS. 3 and 4, for convenience of description, the visual field divider 120 is displayed above the display panel 110, and the visual field divider 120 is implemented as a lenticular lens. The display panel 110 combines and displays images of an object, which are captured at 18 different views, and each lens area of the visual field divider 120 is formed in a size which corresponds to 4.5 pixels of the display panel 110.

The controller 130 may render a first image frame in order to display a first view image in at least some of a plurality of sub pixels. The controller 130 may display the first image frame.

In particular, the controller 130 divides each of the images captured at a plurality of views into a plurality of lines and sequentially combines the lines to generate a first image frame. In this case, an image having one view is not arranged in at least one sub pixel, but images having a plurality of views may be arranged.

Therefore, the controller 130 combines images different from a first view image in at least some sub pixels in order to display the combined image in the at least some sub pixels. In particular, the controller 130 may combine a pixel value of the first view image with pixel values of images having different views from the first view image in at least some sub pixels, based on a ratio of the images having different views from the first view image in order to display a first image frame.

For example, as shown in FIG. 3, the controller 130 may sequentially combine 9 ones of images having 18 different views to generate a first image frame 20. In order to form the images having the 18 different views, an object is captured at a particular place and then sequentially captured in a position that is moved by a predetermined angle. The images having the 18 different views may include a first image, a second image, . . . , a seventh image, and an eighth image.

In this case, the controller 130 may divide each of images that are not captured in adjacent positions, i.e., the first, third, . . . , fifth, and seventh images, into a plurality of lines and combines the lines to generate the first image frame 20. Here, as shown in FIG. 3, a seventh image 21, a first image 22, and a third image 23 may be arranged in an R sub pixel 10.

The controller 130 may calculate an R pixel value that is displayed in the R sub pixel 10, based on area ratios of the seventh image 21, the first image 22, and the third image 23 occupying the R sub pixel 10.

In particular, since the area ratios of the seventh image 21, the first image 22, and the third image 23 occupying the R sub pixel 10 are 1:2:1, the controller 130 calculates a pixel value where R pixel values of the seventh image 21, the first image 22, and the third image are mixed at a ratio of 1:2:1. For example, if the R pixel value of the seventh image 21 is 32, the R pixel value of the first image 21 is 80, and the R pixel value of the third image 23 is 64, an R pixel value of the R sub pixel 10 may be calculated as 64. Pixel values of the other sub pixels may be calculated by using the same method.

The controller 130 may drive the sub pixels according to the calculated pixel values in order to display a first image frame. In response to the first image frame 20 being displayed according to pixel values calculated by using the above-described method, an image of each view is refracted by the visual field divider 120 to form 9 viewing areas 31, 32, . . . , and 39 as shown in FIG. 3. The first, third, . . . , fifth, and seventh images are respectively positioned in the viewing areas.

In response to a distance between the display panel 110 and the visual field divider 120 being closer than a reference distance (for example 10 mm), a distance between images of different views positioned in adjacent ones of the 9 viewing areas 31, 32, . . . , and 39 becomes longer than 63 mm. For example, in response to the distance between the display panel 110 and the visual field divider 120 being half of the reference distance, i.e., 5 mm, a distance between the first image positioned in the first viewing area 31 and the third image positioned in the second viewing area 32 is 126 mm.

Therefore, in response to the distance between the display panel 110 and the visual field divider 120 not satisfying the reference distance, the controller 130 may shift at least one view image in a next image frame to position different view images between adjacent viewing areas.

The controller 130 may render a second image frame to shift and display a second view image based on a position in which the first view image is displayed in at least some sub pixels based on the distance between the display panel 110 and the visual field divider 120. The controller 130 may display the second image frame. Even in this case, one view image is not arranged in at least one sub pixel, but a plurality of view images may be arranged in the at least one sub pixel.

In other words, the controller 130 may shift at least one view image, so that a plurality of different view images are positioned between places of viewing areas in which a plurality of view images displayed through a previous frame are positioned, in order to form the second image frame.

In this case, the controller 130 may determine a degree of shift of the second image so that the degree of shift is inversely proportional to the distance between the display panel 110 and the visual field divider 120 in at least some sub pixels. In other words, as the distance between the display panel 110 and the visual field divider 120 becomes closer, the controller 120 may increase the degree of shift of the second view image in inverse proportion to the distance between the display panel 110 and the visual field divider 120, based on the reference distance.

For example, as shown in FIGS. 3 and 4, the distance between the display panel 110 and the visual field divider 120 is half of the reference distance, i.e., 5 mm. In this case, the controller 130 may shift the second view image by half of a ratio of the first view image occupied in at least some sub pixels based on a place in which the first view image is positioned in the first image frame 20, in order to form a second image frame 40. Here, the second view image may be an image that is captured in an area adjacent to a first view image of a plurality of view images constituting a multi-view image.

In other words, in FIG. 3, the first image 22 occupies 0.5 sub pixels in the R sub pixel 10. Therefore, when the controller 130 sequentially combines 9 different view images that has not been used for generating the first image frame 20, i.e., the second, fourth, sixth, and eighth images, to form the second image frame 40, the controller 130 may shift each of the second, fourth, . . . , sixth, and eighth images by 0.5 sub pixels. Therefore, as shown in FIG. 3, the seventh image 21, the first image 22 and the third image 23 may be arranged in the R sub pixel 10.

Therefore, the controller 130 may render the second image frame where different view images and the shifted second view image are sequentially arranged in at least some sub pixels, according to a degree of shift of the second view image.

The controller 130 may mix the second view image with different view images in at least some sub pixels in order to display the mixed image in the at least some sub pixels. In particular, the controller 130 may mix a pixel value of the shifted second view image and pixel values of the different view images based on ratios of the shifted second view image and the different view images occupied in the at least some sub pixels in order to display the second image frame.

For example, as shown in FIG. 4, a sixth image 41, an eighth image 42, a second image 43, and a fourth image 44 may be arranged in the R sub pixel 10.

The controller 130 may calculate an R pixel value displayed in the R sub pixel 10, based on area ratios of the sixth image 41, the eighth image 42, the second image 43, and the fourth image 44 occupied in the R sub pixel 10.

In particular, since the area ratios of the sixth image 41, the eighth image 42, the second image 43, and the fourth image 44 are 1:7:7:1, the controller 130 calculates a pixel value where R pixel values of the sixth image 41, the eighth image 42, the second image 43, and the fourth image 44 are mixed at a ratio of 1:7:7:1. For example, in response to the R pixel value of the sixth image 41 being 80, the R pixel value of the eighth image 42 is 128, and the R pixel value of the second image 43 is 64, an R pixel value of the R sub pixel 10 may be calculated as 83. Pixel values of the other sub pixels may be calculated by using the same method.

The controller 130 may drive the sub pixels according to the calculated pixel values in order to display the second image frame. In response to the second image frame 40 being displayed according to pixel values calculated by using the above-described method, different view images may be refracted by the visual field divider 120 to form 9 viewing areas 51, 52, . . . , and 59 as shown in FIG. 4. The second, fourth, . . . , sixth, and eighth images are respectively positioned in viewing areas.

Here, since the second, fourth, . . . , sixth, and eighth images are shifted based on the distance between the display panel 110 and the visual field divider 120, the second, fourth, . . . , sixth, and eighth images may be respectively positioned between places where the first, third, . . . , fifth, and seventh images are respectively positioned. In other words, the first, second, third, fourth, fifth, sixth, seventh, and eighth images may be sequentially positioned, and a distance between the first, second, third, fourth, fifth, sixth, seventh, and eighth images may be 63 mm.

In response to the distance between the display panel 110 and the visual field divider 120 being half of the reference distance, i.e., 5 mm, as in the above-described example, and thus the second, fourth, . . . , sixth, and eighth images are shifted by 0.5 pixels, a distance between viewing areas in which the first through eighth images are positioned, is 63 mm. In other words, different view images are positioned at a distance of 63 mm between two eyes of a user.

Therefore, in response to a left eye 61 of the user being positioned in a first viewing area 31, and a right eye 62 of the user is positioned in a second view area 51, a first image is incident into the left eye 61, and a second image is incident into the right eye 62. Therefore, the user who has viewed the first and second images with different eyes may experience a 3D effect.

In response to both eyes of the user being respectively positioned in viewing areas 31, 32, . . . , and 39 in which the first, third, . . . , fifth, and seventh images are positioned and in viewing areas 51, 52, . . . , and 59 in which the second, fourth, . . . , sixth, and eighth images are positioned, the user may experience a 3D effect. Therefore, viewing areas may be seen as extending in a horizontal direction.

First and second image frames may be output at 120 Hz. In other words, since the user experiences the 3D effect through a first view image displayed through the first image frame and a second view image displayed through the second image frame, the controller 130 may control to output the first and second image frames at 120 Hz.

In the above-described example, an image frame is rendered based on images captured at 18 different views, but this is only an example. Therefore, a multi-view image may be variously implemented.

Figure 6:
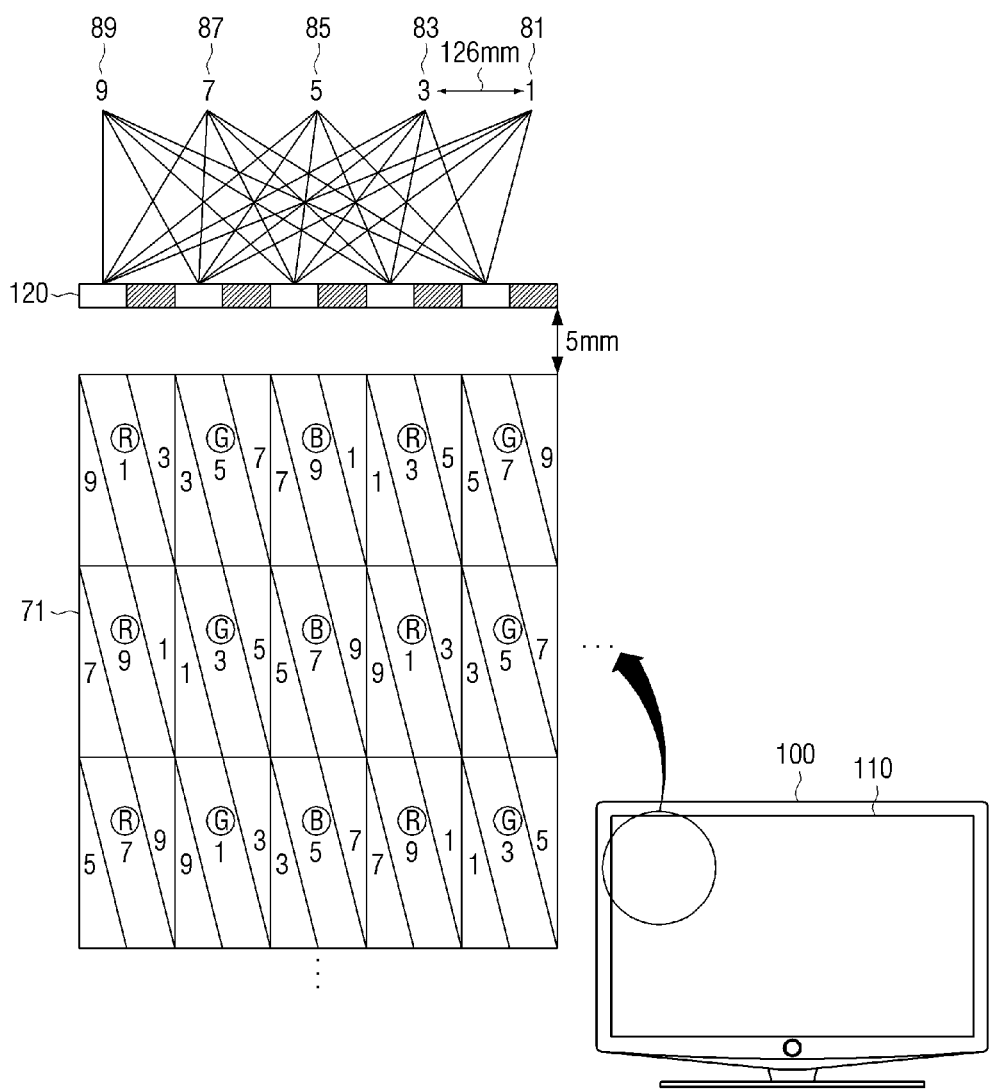
Figure 7:
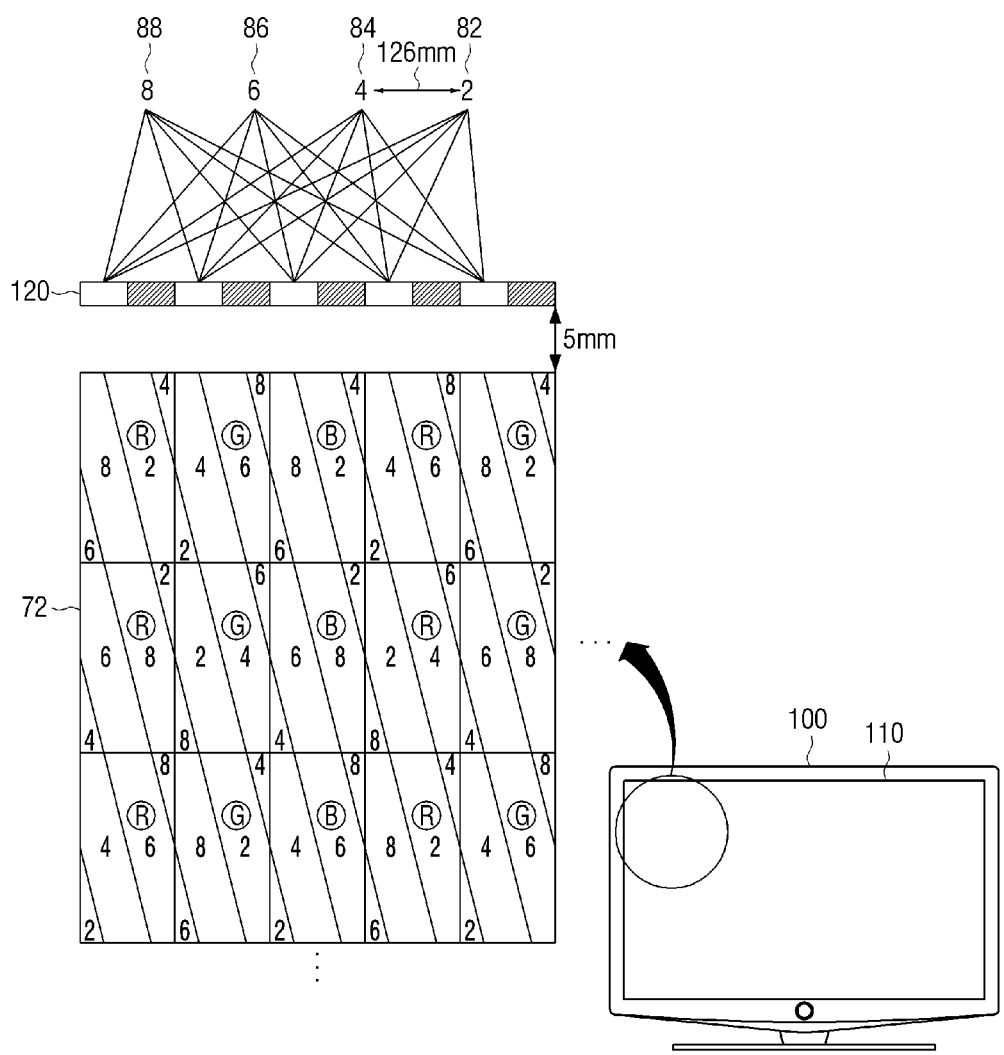

For example, the multi-view image may be images that are captured at 9 different views. The controller 130 may render and display a first image frame 71 and a second image frame 72 that has been shifted as shown in FIGS. 6 and 7. Even in this case, the same method as that described with reference to FIGS. 3 and 4 is applied, and thus its detailed description thereof is omitted.

Therefore, in response to the first image frame 71 being displayed, 5 viewing areas 81, 83, 85, 87, and 89 may be formed at a distance of 126 mm. In response to the second image frame 72 being displayed, 4 viewing areas 82, 84, 86, and 88 may be formed at a distance of 126 mm.

Figure 8:
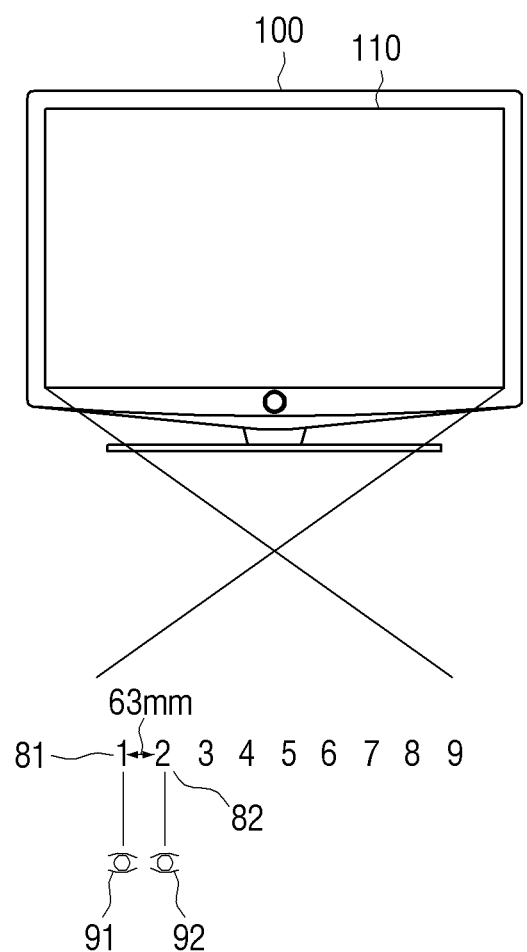

Therefore, as shown in FIG. 8, first, second, . . . , eighth, and ninth images may be sequentially positioned, and a distance between the first, second, . . . , eighth, and ninth images may be 63 mm. As a result, in response to a left eye 91 of a user being positioned in a first viewing area 81, and a right eye 92 of the user is positioned in the second viewing area 82, a first image is incident into the left eye 91, and a second image is incident into the right image 92. Therefore, the user who has viewed the first and second images at different eyes may experience a 3D effect.

In FIGS. 6 through 8, for convenience of description, the visual field divider 120 is disposed above the display panel 110, and the visual field divider 120 is implemented as a lenticular lens.

Figure 9:
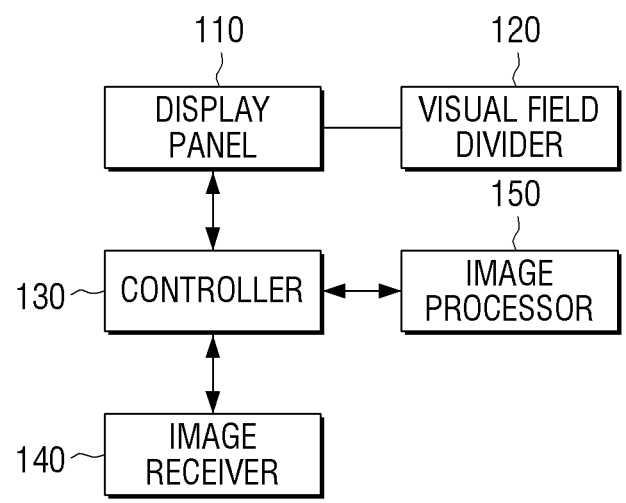
FIG. 9 is a block diagram which illustrates a detailed structure of a display apparatus according to an exemplary embodiment.

FIG. 9 is a block diagram which illustrates a detailed structure of a display apparatus 100 according to an exemplary embodiment. Referring to FIG. 9, the display apparatus 100 further includes an image receiver 140 and an image processor 150 in addition to the display panel 110, the visual field divider 120, and the controller 130. Detailed descriptions of the same elements of FIG. 9 as those of FIG. 2 are omitted herein.

The image receiver 140 receives various types of images. Here, the various types of images may include a multi-view image. In detail, the image receiver 140 may receive the multi-view image from a broadcast station that transmits broadcast program content by using a broadcast network or a web server that transmits a content file by using the Internet. The image receiver 140 may receive the multi-view image from various types of recording medium players that are installed in the display apparatus 100 or connected to the display apparatus 100. The recording medium players refer to apparatuses that reproduces contents stored in various types of recording media such as a compact disc (CD), a digital versatile disc (DVD), a hard disc, a Blue-ray DISC™ (BD), a memory card, a universal serial bus (USB) memory, etc.

The image processor 150 divides video data from input content data, decodes the divided video data, and scales the decoded video data according to the screen size. The image processor 150 may also perform a frame rate conversion operation. Such image processing is well known, and thus its detailed description is omitted. The controller 130 may render a stereoscopic image by using image data that has been image-processed, and its detailed method has been described above.

Figure 10:
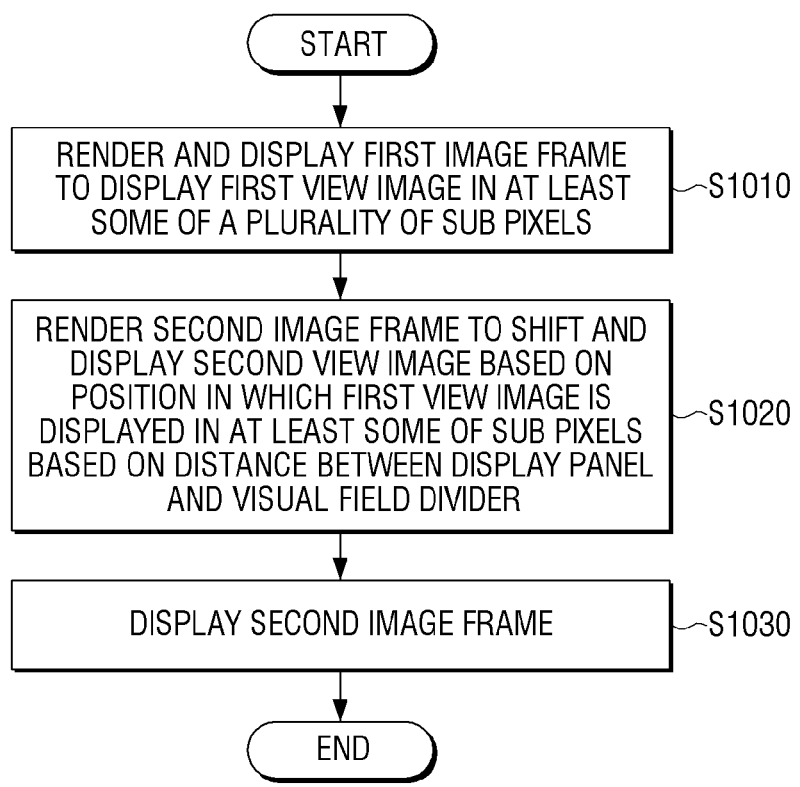
FIG. 10 is a flowchart which illustrates a method of displaying a multi-view image according to an exemplary embodiment.

FIG. 10 is a flowchart which illustrates a method of displaying a multi-view image according to an exemplary embodiment. In particular, a multi-view image display method of a display apparatus, which includes a display panel including a plurality of pixels which includes a plurality of sub pixels and a visual field divider disposed on a front surface of the display panel, will now be described.

In operation S1010, the display apparatus renders and displays a first image frame in order to display a first view image in some of the plurality of sub pixels.

In operation S1020, the display apparatus renders a second image frame to shift and display a second view image based on a position in which the first view image is displayed in at least some of the sub pixels based on a distance between the display panel and the visual field divider.

In this case, the display apparatus may determine a degree of shift of the second view image so that the degree of shift is inversely proportional to the distance between the display panel and the visual field divider, with respect to at least some of the sub pixels.

In particular, the display apparatus may render a second image frame in which different view images and the shifted second view image are sequentially arranged in at least some of the sub pixels according to the degree of shift of the second view image.

In operation S1030, the display apparatus displays the second image frame.

In this case, the display apparatus may mix a pixel value of the shifted second view image and pixel values of different view images based on a ratios of the shifted second view image and the different view images located in at least some of the sub pixels, in order to display the second image frame.

The first and second image frames may be displayed at 120 Hz on the display panel.

The detailed method of the exemplary embodiments has been described with reference to FIGS. 1 through 8.

According to various exemplary embodiments as described above, an optimal stereoscopic image may be provided to a user, and a distance between a display panel and a lens may be reduced. Therefore, the manufacturing cost and weight of a display apparatus may be reduced.

The foregoing exemplary embodiments and advantages are merely exemplary and are not to be construed as limiting. The present teachings can be readily applied to other types of apparatuses. Also, the description of the exemplary embodiments is intended to be illustrative, and not to limit the scope of the claims, and many alternatives, modifications, and variations will be apparent to those skilled in the art.

What is claimed is:

1. A display apparatus comprising:
    a display panel configured to include a plurality of pixels comprising a plurality of sub pixels and configured to display an image frame;
    a visual field divider configured to be disposed on a front surface of the display panel; and
    a controller configured to render and display a first image frame in order to display a first view image in at least some of the plurality of sub pixels and to display a second image frame so that a second view image is shifted and displayed based on a position in which the first view image is displayed in at least some of the sub pixels, based on a distance between the display panel and the visual field divider.

2. The display apparatus of claim 1, wherein the controller is configured to determines degree of shift of the second view image so that the second view image is inversely proportional to the distance between the display panel and the visual field divider in at least some of the sub pixels.

3. The display apparatus of claim 1, wherein the controller is configured to render the second image frame in which different view images and the shifted second view image are sequentially arranged in at least some of the sub pixels, according to the degree of shift of the second view image.

4. The display apparatus of claim 3, wherein the controller is configured to mix a pixel value of the shifted second view image and pixel values of the different view images based on ratios of the shifted second view image and the different view images occupied in at least some of the sub pixels, to display the second image frame.

5. The display apparatus of claim 1, wherein the first and second image frames are displayed at 120 Hz on the display panel.

6. A method of displaying a multi-view image in a display apparatus comprising a display panel having a plurality of pixels comprising a plurality of sub pixels and a visual field divider disposed on a front surface of the display panel, the method comprising:
    rendering and displaying a first image frame in order to display a first view image in at least some of the plurality of sub pixels;
    rendering a second image frame so that a second view image is shifted and displayed based on a position in which the first view image is displayed in at least some of the sub pixels based on a distance between the display panel and the visual field divider; and
    displaying the second image frame.

7. The method of claim 6, wherein the rendering of the second image frame comprises: determining a degree of shift of the second view image so that the second view image is inversely proportional to the distance between the display panel and the visual field divider in at least some of the sub pixels.

8. The method of claim 6, wherein the rendering of the second image frame comprises: rendering the second image in which different view images and the shifted second view image are sequentially arranged in at least some of the sub pixels according to the degree of shift of the second view image.

9. The method of claim 8, wherein a pixel value of the shifted second view image and pixel values of different view images are mixed based on ratios of the shifted second view image and the different view images occupied in at least some of the sub pixels, in order to display the second image frame.

10. The method of claim 1, wherein the first and second image frames are displayed at 120 Hz on the display panel.

11. A display apparatus comprising:
   a controller configured to render and display a first image flame in order to display a first view image in at least some of a plurality of sub pixels and to display a second image flame so that a second view image is shifted and displayed based on a position in which the first view image is displayed in at least some of the sub pixels, based on a distance between the display panel and the visual field divider.

12. The display apparatus of claim 11, further comprising a display panel configured to include a plurality of pixels comprising the plurality of sub pixels.

13. The display apparatus of claim 12, further comprising a visual field divider configured to be disposed on a front surface of the display panel.

14. The display apparatus of claim 11, wherein the first view image is displayed in at least some of the sub pixels, based on a distance between the display panel and the visual field divider.

15. The display apparatus of claim 13, wherein the controller is configured to determines degree of shift of the second view image so that the second view image is inversely proportional to the distance between the display panel and the visual field divider in at least some of the sub pixels.

16. The display apparatus of claim 11, wherein the controller is configured to render the second image frame in which different view images and the shifted second view image are sequentially arranged in at least some of the sub pixels, according to the degree of shift of the second view image.

17. The display apparatus of claim 11, wherein the controller is configured to mix a pixel value of the shifted second view image and pixel values of the different view images based on ratios of the shifted second view image and the different view images occupied in at least some of the sub pixels, in order to display the second image frame.

18. The display apparatus of claim 11, wherein the first and second image frames are displayed at 120 Hz on the display panel.

19. A method of displaying a multi-view image in a display apparatus comprising a display panel having a plurality of pixels comprising a plurality of sub pixels and a visual field divider disposed on a front surface of the display panel, the method comprising:
   rendering and displaying a first image frame in order to display a first view image in at least some of the plurality of sub pixels;
   rendering a second image frame so that a second view image is shifted and displayed based on a position in which the first view image is displayed in at least some of the sub pixels based on a distance between the display panel and the visual field divider.

20. The method of claim 19, further comprising the step of displaying the second image frame.

* * * * *